United States Patent
Chao

(10) Patent No.: US 9,895,029 B2
(45) Date of Patent: Feb. 20, 2018

(54) POSITIONING SYSTEM FOR SEAT OF A BATHING CHAIR

(71) Applicant: Andy Chao, Orange, CA (US)

(72) Inventor: Andy Chao, Orange, CA (US)

( * ) Notice: Subject to any disclaimer, the term of this patent is extended or adjusted under 35 U.S.C. 154(b) by 155 days.

(21) Appl. No.: 14/970,855

(22) Filed: Dec. 16, 2015

(65) Prior Publication Data
US 2017/0172353 A1    Jun. 22, 2017

(51) Int. Cl.
*F16B 7/04* (2006.01)
*F16B 12/26* (2006.01)
*A47K 3/12* (2006.01)

(52) U.S. Cl.
CPC .............. *A47K 3/122* (2013.01); *F16B 12/26* (2013.01); *F16B 7/0493* (2013.01); *Y10T 403/591* (2015.01); *Y10T 403/7171* (2015.01)

(58) Field of Classification Search
CPC ...... A47K 3/122; A47K 3/282; A47K 13/005; F16B 7/0406; F16B 7/048; F16B 7/0486; F16B 9/02; F16B 9/023; F16B 12/2009; F16B 12/26; F16B 12/32; F16B 12/38; Y10T 403/32501; Y10T 403/32508; Y10T 403/32516; Y10T 403/59; Y10T 403/591; Y10T 403/593; Y10T 403/595; Y10T 403/7188; Y10T 403/7171
USPC ............ 403/109.5, 109.6, 109.7, 321, 322.1, 403/322.3, 322.4, 396, 399; 4/578.1
See application file for complete search history.

(56) References Cited

U.S. PATENT DOCUMENTS

| | | | |
|---|---|---|---|
| 7,451,501 B2 * | 11/2008 | Cheng .................... | A47K 3/122 4/560.1 |
| 2008/0148473 A1 * | 6/2008 | Cheng .................... | A47K 3/122 4/578.1 |

OTHER PUBLICATIONS

"Axis." Google.com. [online], [retrieved on Jul. 15, 2017]. Retrieved from the Internet <URL:https://www.google.com/search?q=define%3A+axis>.*

* cited by examiner

*Primary Examiner* — Josh Skroupa
(74) *Attorney, Agent, or Firm* — Pro-TECHTOR International Services; Ian Oglesby

(57) ABSTRACT

A positioning system for seat of a bathing chair comprises: a bearing assembly, which is mounted at the bottom of a seat of a bathing chair and can glide on the upper girder, wherein the bearing assembly is hold on the top pin of the upper girder; an axle, which is rotatable in the said bearing assembly; and a swing element, which is mounted on the axle and makes the top pin retracted in the upper girder; wherein at the top of the bearing assembly there is a joint groove with an upward opening; wherein the axle is set in the joint groove through the opening of the joint groove of the bearing assembly; by the combination of the joint groove with the axle it is achieved that product yield is improved and assembly is set in the joint groove.

4 Claims, 7 Drawing Sheets

POSITIONING SYSTEM FOR SEAT OF A BATHING CHAIR

FIELD OF THE INVENTION

The present invention relates to a positioning system for seat of a bathing chair, particularly to a positioning system for seat of a bathing chair applied to a bathtub, wherein product yield is improved and assembly is easy.

BACKGROUND OF THE INVENTION

Bathing chair is a chair across a bathtub, e.g. in the U.S. Pat. No. 7,451,501 (Bathing Chair With Fixing Device); wherein the seat is turnable between inside and outside of a bathtub. Therefore it is helpful for old and handicapped people to get in and out of a bathtub.

As shown in FIG. 9, In conventional positioning system 9 for seat of a bathing chair, mostly a bearing assembly 91 is tight fitted with an axle 92 for mounting a swing element 93. However, the swing element 93 needs to be fictitiously mounted in the bearing assembly 91, before the axle 92 is mounted. In this way it is too complicated to assembly. Besides, other components can be defected due to deviation of the axle. Thence product yield is reduced and costs for inspection are increased.

In view of these disadvantages the inventor performed continuous testing and improvement and developed the present invention.

SUMMARY OF THE INVENTION

The object of the present invention is to provide a positioning system for seat on a bathing chair, wherein product yield is improved and assembly is easy.

For achieving above object the present invention comprises: a bearing assembly, which is mounted at the bottom of the seat of a bathing chair and can glide on an upper girder of the bathing chair; wherein on side wall of the bearing assembly there is a hole to hold a top pin of the upper girder thereon; wherein on the top of the bearing assembly there is a joint groove with an upward opening; an axle, which is rotatable in the joint groove of the said bearing assembly; and a swing element, which is mounted on the axle to swing toward the bearing assembly and is passing through the opening thereof, thereby the top pin is retracted in the upper girder. Owing to combination of the joint groove of the bearing assembly with the axle, it is achieved that product yield is improved and assembly is easy.

Preferably, the joint groove of the bearing assembly has a joint part of somewhat larger, round section area; the axle has a rectangular section area with two long sides and two short sides; wherein the long sides are longer than the opening of the joint groove of the bearing assembly, while the two short sides are shorter than the opening of the joint groove of the bearing assembly; thereby it is ensured that the axle cannot come off accidently.

Preferably, according to section of the joint part of the bearing assembly, the short sides of the joint axle have a convex shape to reinforce the axle.

Preferably, the axle and the swing element are made of one piece.

Preferably, there is a plate on the end of the swing element, for user to switch the swing element.

Other aspects and advantages of the present invention will become apparent from the following detailed description, taken in conjunction with the accompanying drawings, illustrating by way of example the principles of the present invention.

DESCRIPTION OF THE PREFERRED EMBODIMENTS

Figure 1:
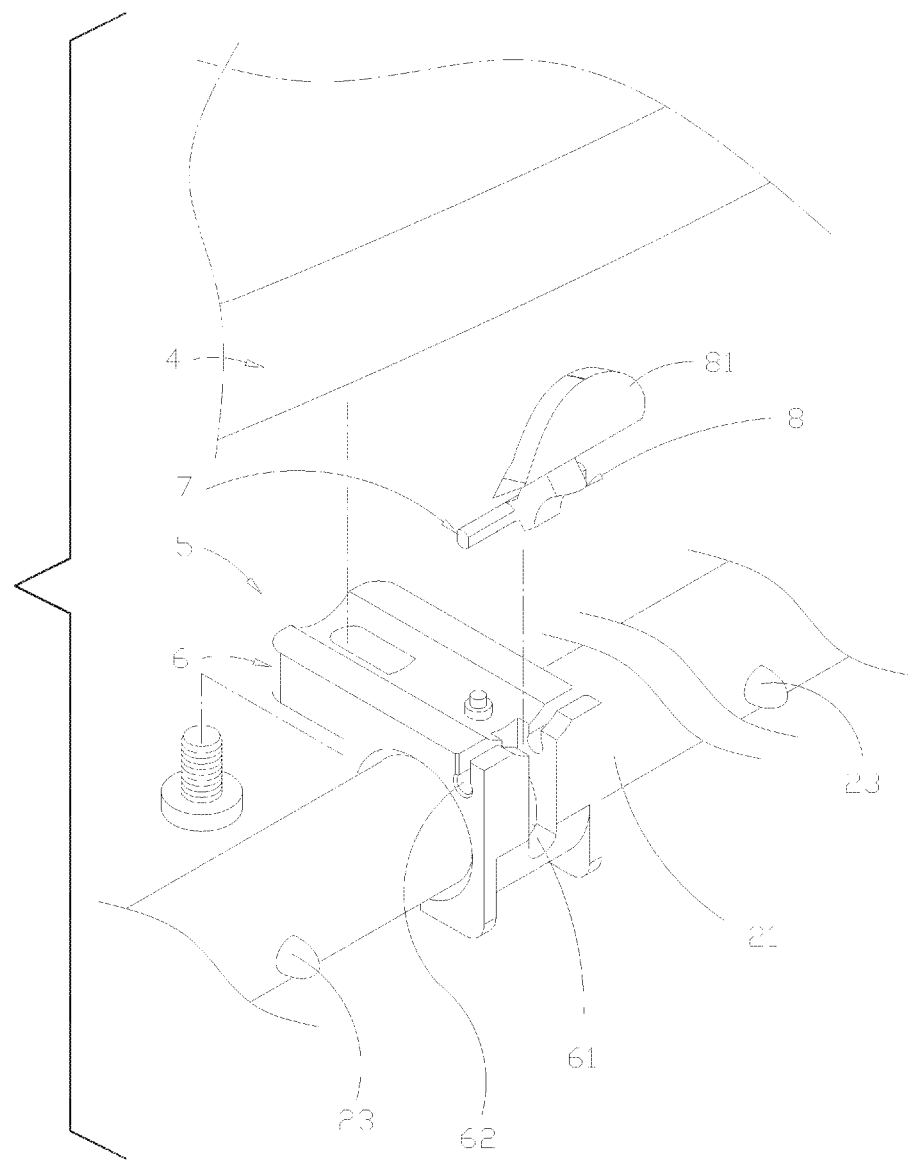
FIG. 1 shows the present invention mounted on seat of a bathing chair and on an upper girder.

As shown in FIG. 1, positioning system for seat of a bathing chair of the present invention 5 comprises: a bearing assembly 6, which is mounted at the bottom of the seat 4 of a bathing chair and can glide on an upper girder 21 of the bathing chair; wherein there is an opening 61 on side wall of the bearing assembly to hold a top pin 23 of the upper girder; wherein there is a joint groove 62 with an upward opening on the top; an axle 7, which is rotatable in the joint groove 62 of the bearing assembly 6; and a swing element 8, which is mounted on the axle 7 to swing toward the bearing assembly 6 and is passing through the opening thereof, thereby the top pin 23 is retracted in the upper girder 21. Owing to combination of the joint groove 62 of the bearing assembly 6 with the axle 7, it is achieved that product yield is improved and assembly is easy.

The bearing assembly 6 is mounted at the bottom of the seat 4 of a bathing chair, wherein the bearing assembly 6 can glide on the upper girder 21 of the bathing chair, thence the seat 4 can also glide on the upper girder 21.

On side wall of the bearing assembly 6 there is an opening 61, to hold the top pin 23 of the upper girder 21, thereby the user can easily position the seat at a predestined position.

On the top of the bearing assembly 6 there is a joint groove 62 with an upward opening, thereby the axle 7 is easily assembled.

The axle 7 is rotatable in the joint groove 62 of the bearing assembly 6, wherein the axle 7 is set in the joint groove through the opening of the joint groove at the top of the bearing assembly 6. In comparison with conventional tight-fit technique, in this construction it is ensured that the components cannot be defected easily, thence the product yield is improved, and assembly is easy.

The swing element 8 is mounted on the axle 7 to swing toward the bearing assembly 6 and is passing through the opening 61 thereof, thereby the top pin 23 is retracted in the upper girder 21; wherein the swing element 8 and the axle 7 are made of one piece.

On the end of the swing element 8 there is a plate 81, thereby user can switch the swing element 8 easily.

Figure 2:
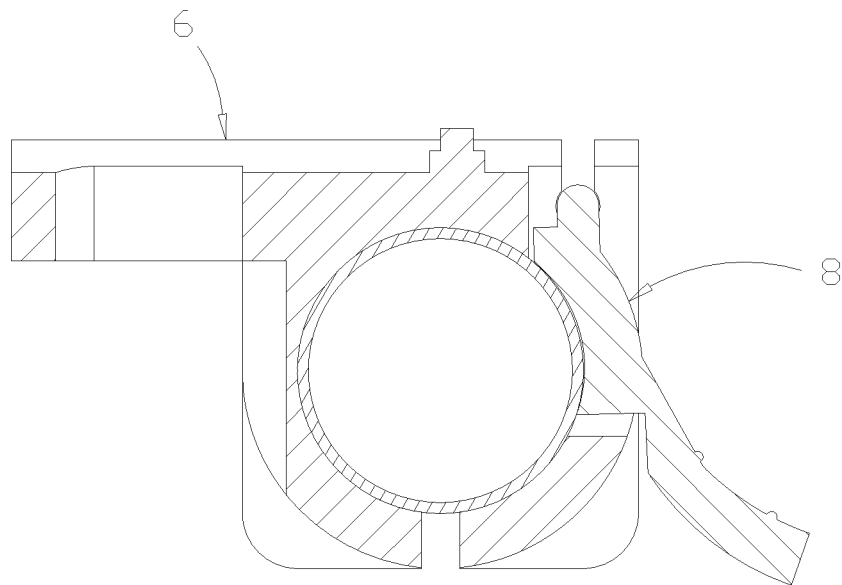
FIG. 2 shows a swing element of the present invention in a position of natural drooping
Figure 3:
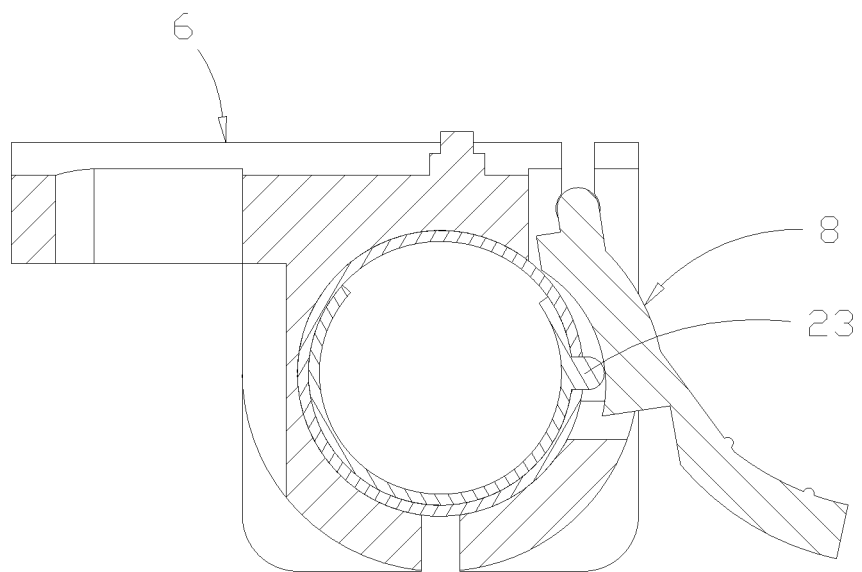
FIG. 3 shows a bearing assembly holding the top pin of a bathing chair.
Figure 4:
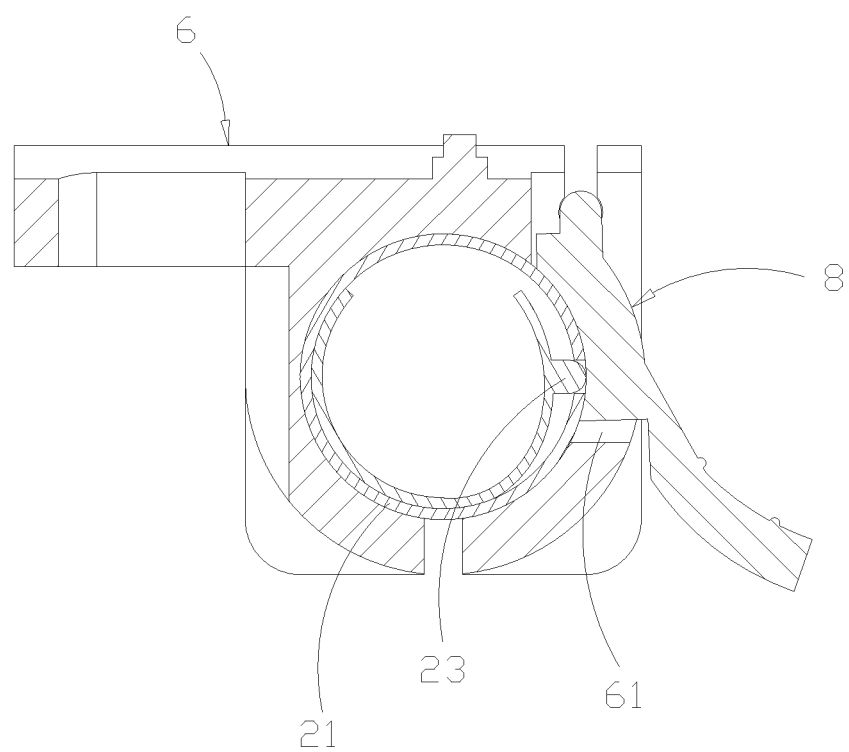
FIG. 4 shows a swing element of the present invention making the top pin retracted in the upper girder.

FIG. 2-4 show positions of the swing element 8. As shown in FIG. 2, the swing element 8 is in a position of natural drooping, before the top pin 23 is hold by the bearing assembly 6. As shown in FIG. 3, the swing element 8 is lifted up by the top pin 23, after the top pin 23 is hold by the bearing assembly 6; in this status the bearing assembly 6 is positioned, thence the seat cannot glide accidently. As shown in FIG. 4, when the swing element 8 has been switched toward the opening 61 of the bearing assembly, so that the top pin 23 is retracted in the upper girder 21, thus the bearing assembly 6 is glidable, thereby it is easy to move the seat.

Figure 5:
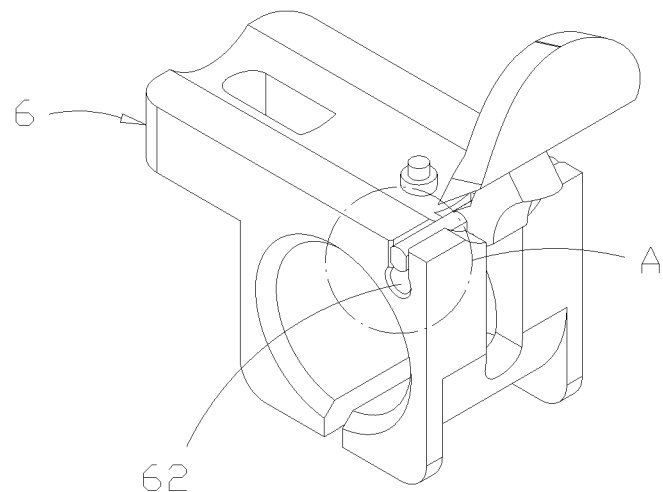
FIG. 5 shows the axle of the present invention set in joint groove of the bearing assembly.
Figure 6:
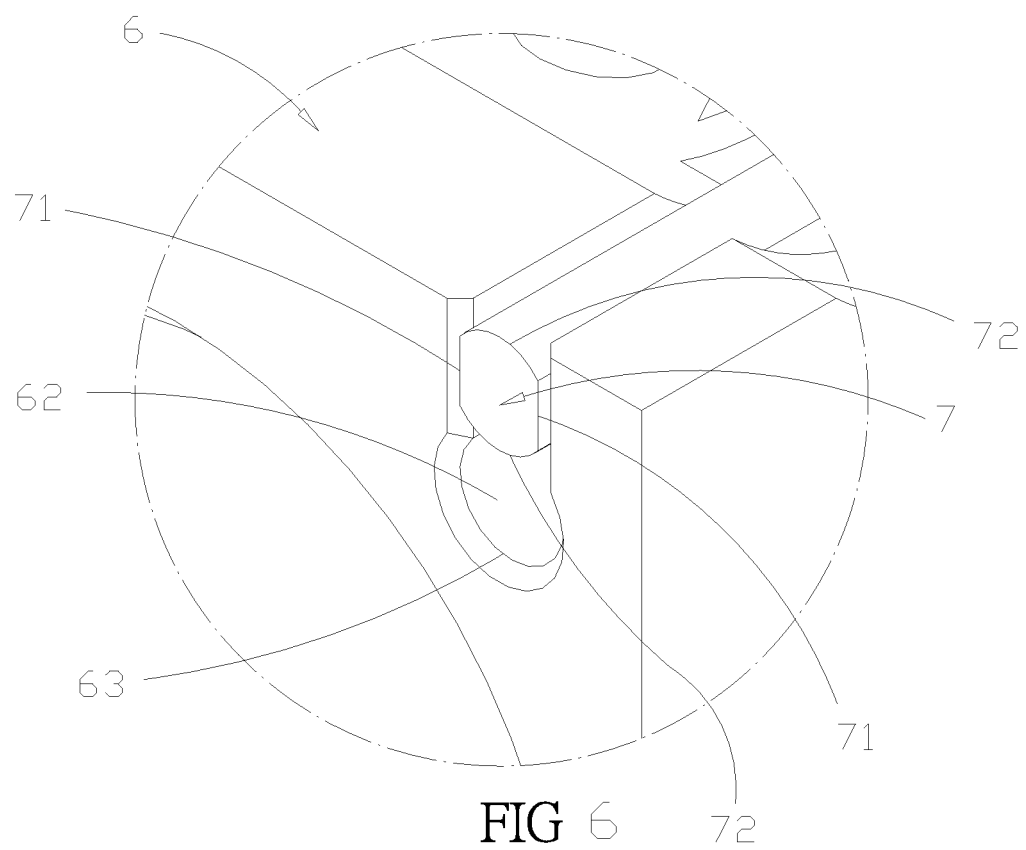
FIG. 6 is an enlargement of Part A in FIG. 5.
Figure 7:
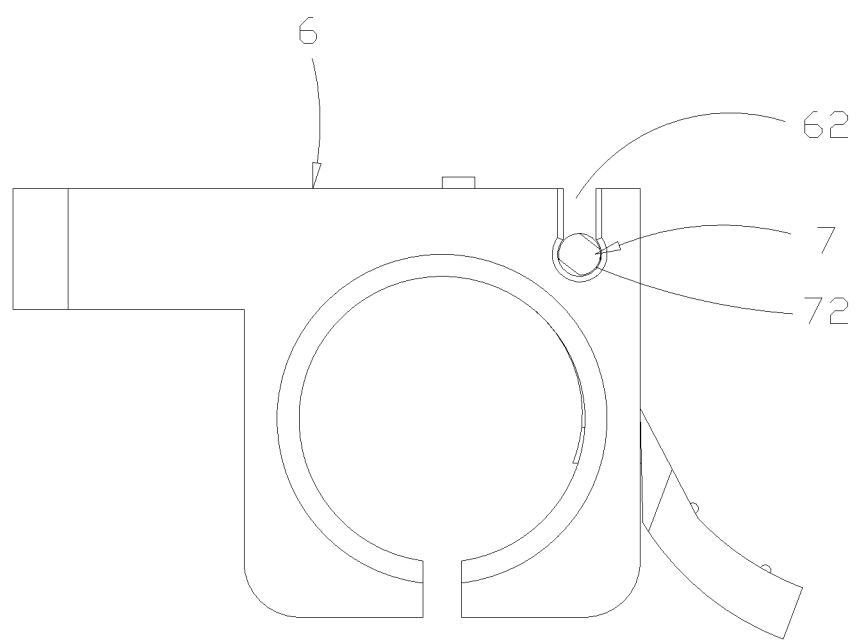
FIG. 7 shows the axle of the present invention in combination with the joint groove of the bearing assembly

As shown in FIG. 5-6, the joint groove 62 of the bearing assembly 6 has a joint part 63 with a somewhat larger round section area at the bottom; the section area of the axle 7 is rectangular, having two long sides 71 and two short sides 72; the long sides are longer than the joint groove 62 of bearing assembly 6; while the short sides 72 are shorter than the opening of the joint groove 62; thereby, the axle 7 is easily to set into the bottom of the joint groove 62 of the bearing assembly 6, whenever the shorter sides 72 are aimed to the opening of the joint groove 62 of the bearing assembly 6. As shown in FIG. 7, after the axle 7 is set at the bottom of the joint groove 62 of the bearing assembly 6, wherein the short sides 72 cannot be aimed to the opening of the joint groove 62 of the bearing assembly 6 just by rotating the axle 7, thereby the axle 7 cannot come off accidently. Besides, by fixing the bearing assembly 6 at the bottom of the seat 4, the opening of the joint groove 62 can also be closed by the seat 4.

According to section of the joint part 63 of the bearing assembly 6, the short sides 72 of the axle 7 have a convex shape, thereby the axle 7 is reinforced.

Figure 8:
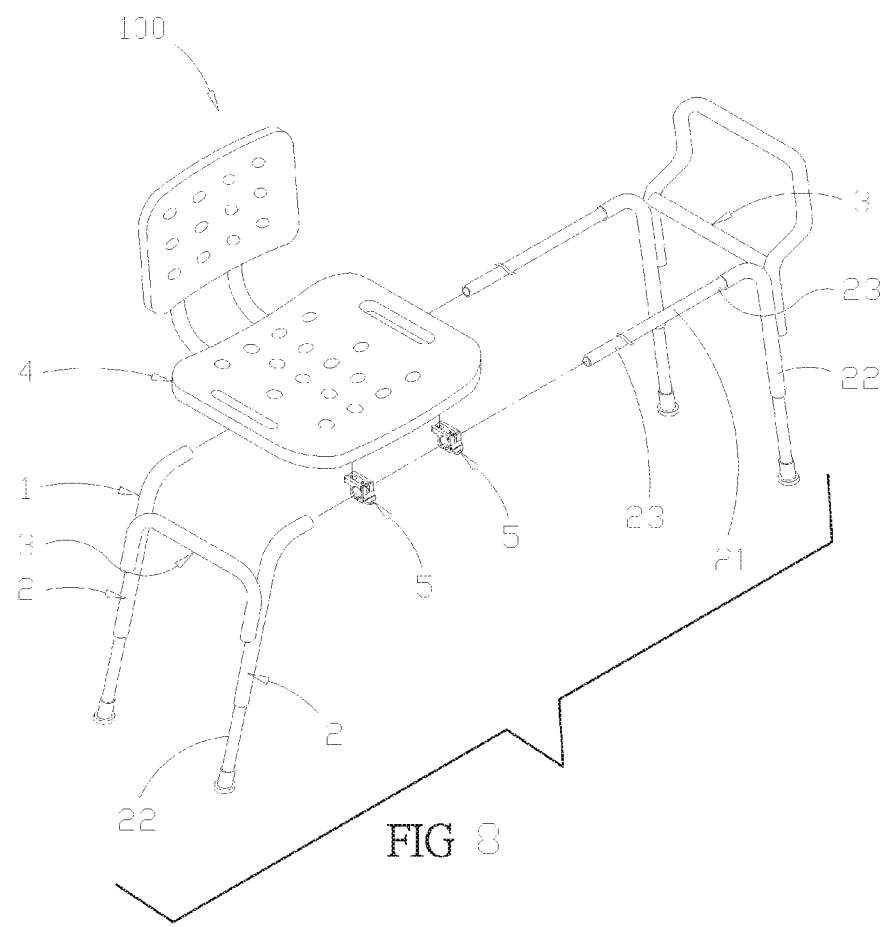
FIG. 8 shows an embodiment of the present invention applied to a bathtub.
Figure 9:
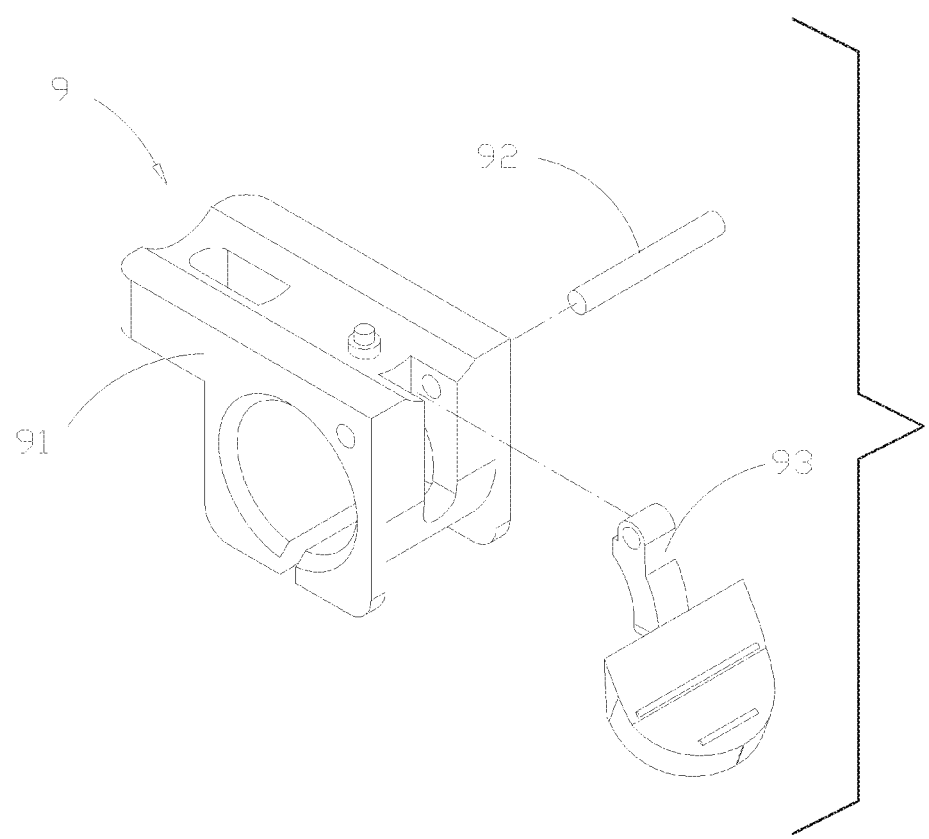
FIG. 9 shows a conventional positioning system for seat of a bathing chair.

As shown in FIG. 8, the positioning system for seat of a bathing chair 5 can be applied to a bathing chair 100 in several sets. The bathing chair 100 comprises: a frame 1, comprising two frame bodies 2; wherein there are two U-shaped rods respectively, constructed of one upper girder 21 and two side rods 22; wherein both ends of the upper girder 21 there is an adjustable top pin 23 respectively; two crossbeams 3 crossing over the two frame bodies 2 are set on the front and rear sides of the two frames 2; wherein the frame 1 passing through inner and outer sides of the bathtub; a seat 4, which can glide on the upper girder 21 of the two frame bodies 2; and several positioning systems for seat of a bathing chair 5, which are distributed at the bottom of the seat 4, connecting the upper girder 21. Thereby it is easy to control the seat, furthermore it is achieved that product yield is improved and assembly is easy.

The invention claimed is:

1. A positioning system for a seat of a bathing chair, comprises:
    a bearing assembly, which is mounted at the bottom of a seat of the bathing chair and is glidable on the upper girder of the bathing chair; wherein there is an opening on a side wall for holding a top pin of an upper girder;
    an axle, which is rotatable in the said bearing assembly; and
    a swing element, which is mounted on the axle to swing toward the bearing assembly and which is passing through the opening thereof, whereby the top pin is retracted in the upper girder;
        wherein, at the top of the said bearing assembly there is a joint groove with an upward opening; the axle is set in the joint groove through the opening of the joint groove of the bearing assembly,
    wherein the joint groove of the said bearing assembly has a joint part, having a round section area; wherein the axle has a rectangular stadium shaped area having two longer sides and two shorter sides; wherein the longer sides are longer than the opening of joint groove of the bearing assembly; while the shorter sides are shorter than the opening of the joint groove.

2. The positioning system for seat of a bathing chair of claim 1, wherein the short sides of the axle have a convex shape corresponding to section of the joint part of the bearing assembly.

3. The positioning system for seat of a bathing chair of claim 1, wherein the said axle and the swing element are formed of one piece.

4. The positioning system for seat of a bathing chair of claim 1, wherein on the end of the swing element there is a plate.

* * * * *